United States Patent [19]

Caldwell et al.

[11] 4,135,141
[45] Jan. 16, 1979

[54] MARINE SEISMIC STREAMER WITH DEPTH SENSOR CALIBRATING MEANS

[75] Inventors: Stephen A. Caldwell; Randall R. Massey, both of Dallas, Tex.

[73] Assignee: Whitehall Corporation, Dallas, Tex.

[21] Appl. No.: 773,413

[22] Filed: Mar. 1, 1977

[51] Int. Cl.$^2$ .................... G01V 1/38; B63B 21/56
[52] U.S. Cl. .................... 340/7 PC; 114/245; 73/4 R
[58] Field of Search .................... 340/7 PC, 18 PC; 114/245, 244; 73/4 R; 174/101.5

[56] References Cited

U.S. PATENT DOCUMENTS

| | | | |
|---|---|---|---|
| 2,465,696 | 3/1949 | Paslay | 340/7 PC |
| 2,871,665 | 2/1959 | Brandt | 340/7 PC |
| 3,049,148 | 8/1962 | Richardson | 73/4 R |
| 3,280,834 | 10/1966 | Zahuranec | 73/4 R |
| 3,371,739 | 3/1968 | Pearson | 340/7 PC |
| 3,557,602 | 1/1971 | Frantz | 73/4 R |
| 3,680,520 | 8/1972 | Smith | 340/7 PC |
| 3,794,965 | 2/1974 | Charske | 340/7 PC |

FOREIGN PATENT DOCUMENTS 2240446   4/1975   France ..................... 73/4 R

Primary Examiner—Nelson Moskowitz
Attorney, Agent, or Firm—Mason, Fenwick & Lawrence

[57] ABSTRACT

A marine seismic streamer section for a towed underwater streamer containing a buoyancy regulating fill liquid and the usual hydrophones, strain cables, signal wires and the like housed in a generally cylindrical tubular jacket sealed at its ends against loss of fill liquid and containing a depth sensor for producing electrical signals indicative of the depth of the streamer. The sensor is in a rigid housing whose interior is connected by a tube to a valved calibrating chamber having a valve member normally communicating the interior of the depth sensor housing to the fill liquid pressure conditions in the jacket. The chamber has an external access port normally closed by a plug, and the valve member is movable by a probe inserted through the port when the plug is removed and a source of gauged pressure connected to the access port to subject the interior of the depth sensor housing to the gauged pressure source.

20 Claims, 6 Drawing Figures

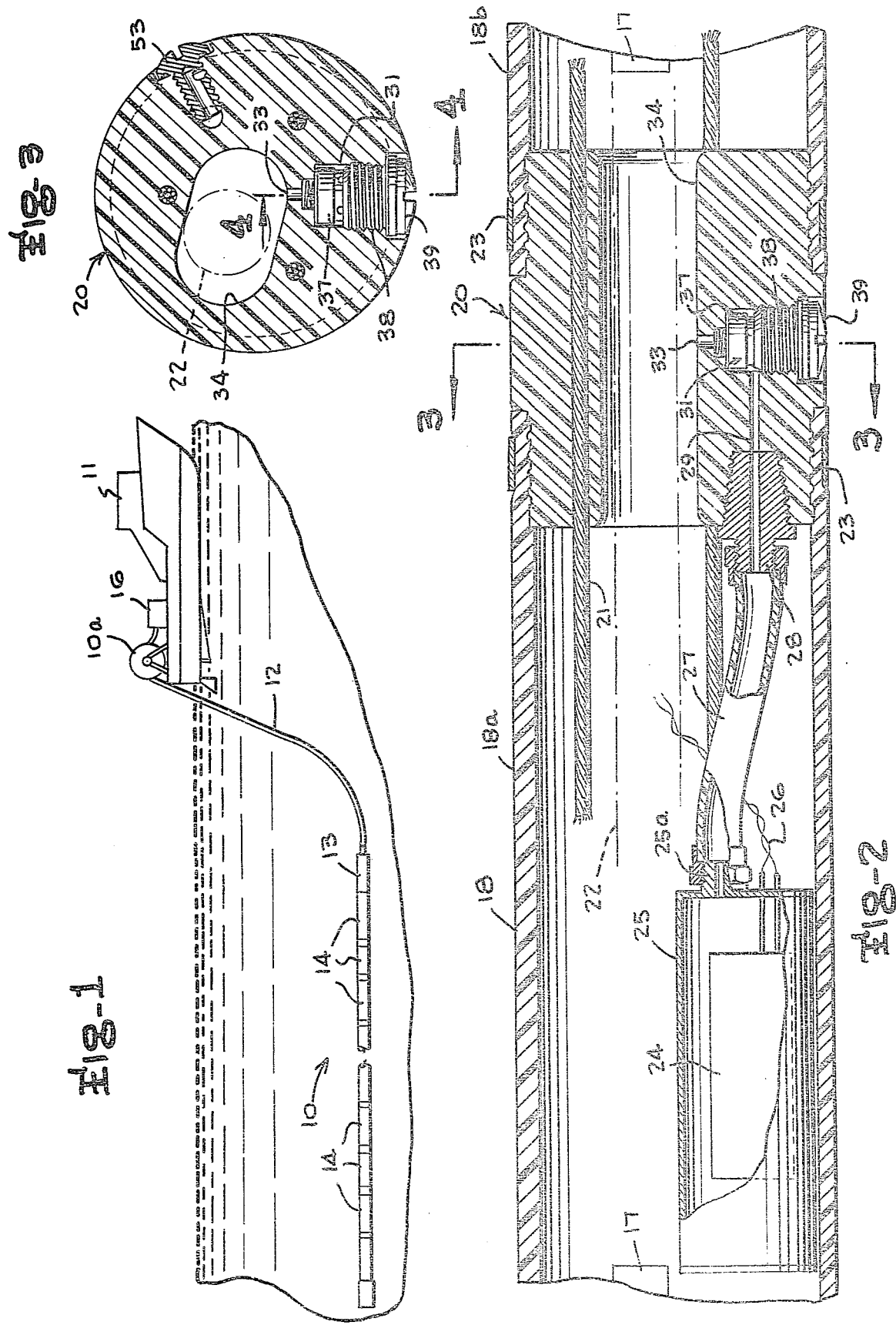

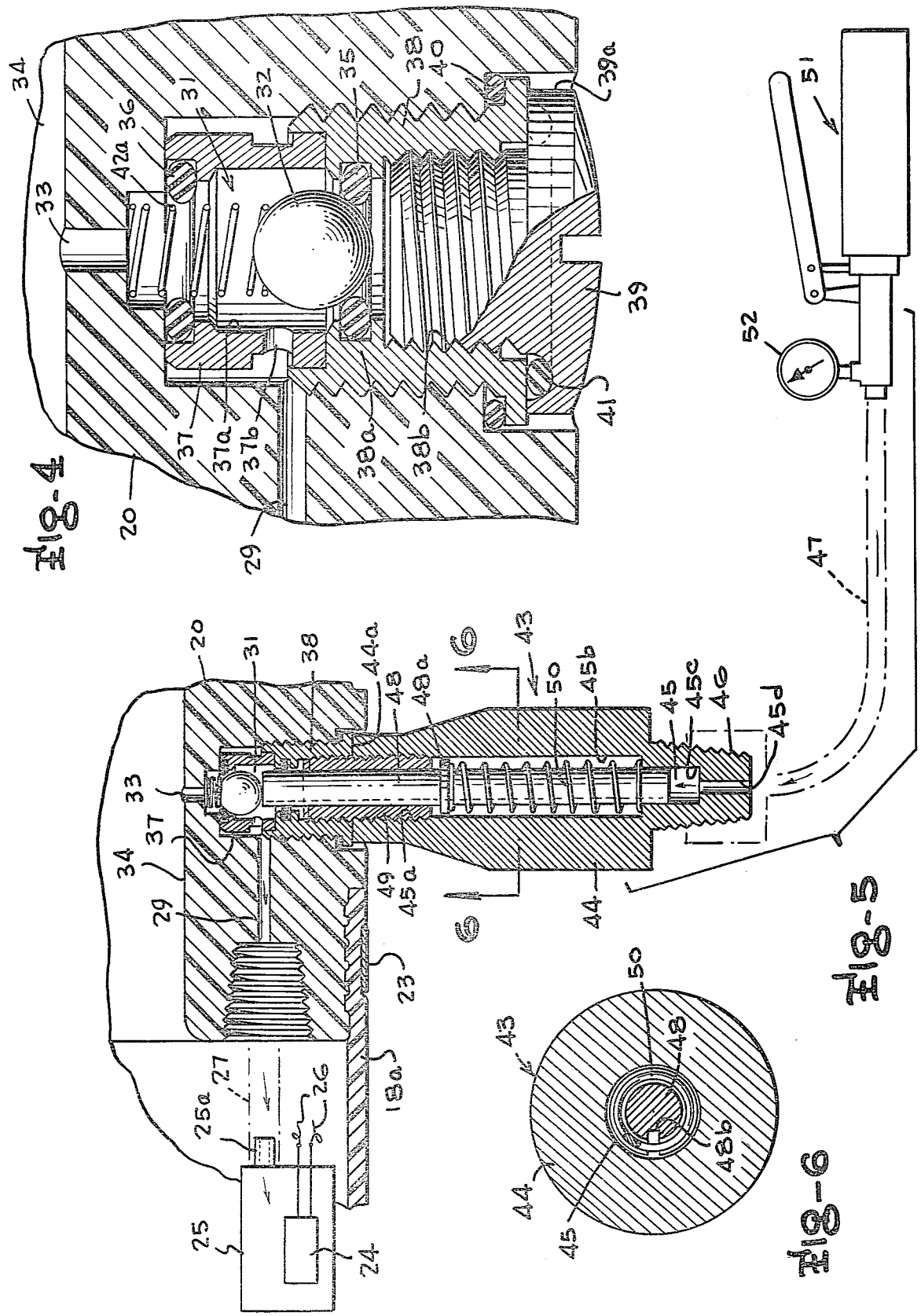

MARINE SEISMIC STREAMER WITH DEPTH SENSOR CALIBRATING MEANS

BACKGROUND AND OBJECTS OF THE INVENTION

The present invention relates in general to marine seismic cable systems formed of a plurality of interconnected seismic streamer sections arranged in series and adapted to be towed at a predetermined depth for seismic surveying for prospecting purposes to survey subaqueous geological formations and exploring oil retaining subsurface terrestrial structures by detecting seismic signals received by a plurality of hydrophone arrays in the streamer section, and more particularly, to marine seismic detection streamers having a plurality of serially connected elongated hydrophone containing streamer sections and including means for maintaining the seismic streamer at a predetermined depth, and wherein the seismic cable structure is arranged to facilitate calibration of depth sensor means incorporated therein designed to signal the depth of the streamer.

Heretofore, a number of marine seismic detection cables or streamers, the terms being used interchangeably, have been devised for making seismic surveys of terrestrial subsurface structures disposed beneath sea water. In general, the marine seismic streamers employed in modern seismic marine surveying systems have been of the general construction illustrated, for example, in the earlier U.S. Pat. Nos. 2,465,669 or 2,725,300 issued to Leroy C. Paslay et al, wherein the streamers have included a lead-in cable and a long series of serially connected active streamer sections, each usually formed of a plastic tube filled with a liquid of selected buoyancy characteristics and sealed at opposite ends by end cap connectors, and housing an array of hydrophones, strain cables, structural spacers, transformers and transformer holders, and mechanical and electrical leads. Such marine seismic streamers or cables may in many cases be a mile or more in length, with each section being typically 100 feet or more in length. During seismic survey or prospecting operations, such streamers are towed by the seismic survey vessel at a selected depth below the surface of the sea, and are maintained at the desired underwater depth by any of several types of devices, the efficiency of the seismic survey being affected to a large extent by the ability to maintain the various hydrophones along the length of the cable at the same predetermined depth.

Efforts have been made to maintain the seismic streamer at a selected predetermined depth in the water while the cable is being towed by the surveying vessel, by using a plurality of weights at spaced intervals along the cable to make the cable negatively buoyant, and by using flotation means or ring buoy means associated with the cable to assist in maintaining it at the desired depth. Other efforts have been devoted to the provision of paravane structures which are secured to the seismic streamer and employ diving planes which are regulated in preselected relation to pressure responsive devices in the wall of the paravane to maintain a desired depth.

Similar long towed hydrophone arrays have also been employed as underwater listening devices for detecting submarines or underwater vessels used in warfare, such towed hydrophone arrays being employed as passive underwater detection systems in what are referred to as ASW streamers. Again, the reliability of location of the object to be detected by such streamers depends upon the accuracy with which the hydrophones along the length of the streamer are maintained at the desired subsurface depth.

In towed underwater hydrophone arrays of either of the types described above, the seismic pressure detecting devices or hydrophones disposed along the streamer respond to the underwater sound pressure waves or phenomena to be detected by the hydrophones and convert such phenomena to electrical information in the form of an output voltage proportional to the applied accoustic pressure, to be transmitted to signal processing equipment on the geophysical boat or towing vessel. Earlier U.S. Pat. No. 3,660,809 discloses a particular hydrophone structure which may be used in such marine seismic streamers, reducing the acceleration sensitivity of the hydrophone elements without impairing their pressure sensing ability, and thus providing a high sensitivity to sound pressure variations within the required frequency range and at a low sensitivity to accelerations produced by vibrations in the streamer system.

A system for variably controlling the buoyancy of a seismic detection streamer is disclosed in U.S. Pat. No. 3,371,739 granted to Raymond H. Pearson. The streamers formed of a plurality of sections of neutrally buoyant liquid filled sections, having a control liquid inlet valve and a control liquid exhaust valve in each streamer section for controlling the amount of buoyancy control liquid within the streamer section and thereby maintaining a predetermined degree of buoyancy. Depth transducer devices or sensors are provided in the streamer sections for producing depth indicator signals whose frequency varies with depth and superimposing these signals on the hydrophone signals being transmitted to the towing vessel. In one embodiment, the operator on the towing vessel observes a depth indicator and manually adjusts switches on the towing vessel to remotely activate the valves in the streamer sections to properly adjust the buoyancy. In another embodiment, the depth indicating signals superimposed on the hydrophone signals activate a depth indicating circuit on a towing vessel to operate relays on the towing vessel for remotely regulating the valve in the streamer sections. Alternatively, valves may be provided in the streamer sections themselves controlled directly by depth sensor devices in the associated streamer section for supplying additional buoyancy control fluid to the section or discharging fluid from the section to regulate its buoyancy so that it maintains the desired depth.

The present invention relates to marine seismic towed arrays or streamers provided with means for determining the depth at which the array is being towed by means of a depth sensor provided in the streamer or a section of the array and constructed in a manner to facilitate calibrating of the depth sensor. Depth sensors in towed arrays are commonly pressure sensors. Water pressure at various depth is, of course, proportional to the depth. In a marine seismic towed array, the pressure or depth sensor is most often located inside of the array in a fluid, usually less dense than the water surrounding the towed array or streamer. Water pressure outside of the array or streamer is communicated to fluid inside of the array or streamer through the flexible plastic, rubber or other jacket material surrounding the streamer and in turn actuates a pressure sensor which may be any one of several types, such as a strain gauge, a variable reluctance type pressure sensor, or other type. Signals from these sensors are transmitted to indicators or readouts on board the towing vessel to provide indication of the depth at which the seismic streamer portion housing the sensor is operating. Such signals from the sensors may also be used to automatically control remotely or directly buoyancy regulating valves or similar means in the seismic streamer.

To insure that the depth indications or readouts on board the towing vessel produced from the sensor signals show the correct depth, it is necessary to accurately calibrate the sensor-indicator system. This is frequently done by lowering the sensor and streamer array to a known depth and comparing the indicator readout to the actual depth. This is a time consuming and laborious but accurate method. Another method of calibrating the sensor-indicator system is to surround that portion of the seismic streamer or array which contains the depth sensor with a rubber-like bladder which can be inflated with air at various pressures. That portion of the streamer or array not covered by the bladder must have previously been sealed internally so that the fluid surrounding the sensor will assume the pressure inflating the bladder. The bladder pressure is then compared to the depth indicator readout for calibration. The bladder assembly must have an external rigid case to contain the applied test pressure. The rubber-like bladder assembly is usually about four to five feet long and weighs 50 to 75 pounds. It is necessary to secure it around the streamer portion containing the sensor with the streamer portion usually in a nearly horizontal position, which may require five to ten minutes. Some inaccuracy exists since the exact pressure applied to the bladder may not be transmitted faithfully to the fluid inside of the streamer or array if the fit between the bladder and the streamer is not excellent.

The present invention is directed to the provision of an improved seismic detection streamer construction for towed seismic detection streamers having a depth sensor incorporated in the streamer section for supplying depth indicating signals to an indicator or readout on board the towing vessel, wherein the streamer section construction is arranged to facilitate a quick and accurate calibration of the sensor-indicator system by connecting a calibration tube to a spacer of the streamer section for applying pressure from a pump to the sensor monitored by a guage, and which may be readily attached to or disconnected from the streamer section.

An object of the present invention, therefore, is the provision of a seismic streamer construction for marine seismic streamers of the type having depth indicating sensors incorporated in the underwater streamer sections, constructed to provide means for quick and accurate calibration of the sensor and depth indicator system associated therewith by ready application of a gauged pressure pump to the depth sensor housing.

Another object of the present invention is the provision of a novel seismic streamer construction as described in the immediately preceding paragraph, wherein the depth sensor is of the pressure transducer type supporting inside a housing in the streamer and hydraulically coupled through a tube to a special spacer in the streamer constructed to facilitate connection of a calibration tube and gauged pump thereto in a manner permitting quick coupling and decoupling from the special spacer and permitting application of gauged pressures to the sensor to calibrate the streamer pressure sensor-readout system.

Other objects, advantages and capabilities of the present invention will become apparent from the folowing detailed description, taken in conjunction with the accompanying drawings illustrating a preferred embodiment of the invention.

BRIEF DESCRIPTION OF THE FIGURES

FIG. 1 is a diagrammatic view of a marine seismic streamer embodying the present invention, shown in normal condition while being towed;

FIG. 2 is a longitudinal section view of a portion of a streamer section of the seismic streamer having the special spacer of the present invention constructed for ease of calibration of the sensor and depth indication system for the streamer;

FIG. 3 is a transverse section view, to enlarged scale, through the special spacer and the calibration plug and valve assembly portion thereof, taken along the line 3—3 of FIG. 2, showing the same in normal closed condition as when the streamer is being used to make seismic surveys;

FIG. 4 is a longitudinal fragmentary section view, to enlarged scale, of the calibration plug and valve assembly portion of the special spacer, taken along the line 4—4 of FIG. 3;

FIG. 5 is a section view, similar to FIG. 4, through the calibration plug and valve assembly portion of the special spacer, showing the same with the plug removed and the depth transducer calibration fitting mounted therein, in condition for calibrating the depth transducer, with the depth transducer and the pump, gauge and calibration tube associated therewith shown in diagrammatic form; and FIG. 6 is a transverse section view through the calibration fitting, taken along the line 6—6 of FIG. 5.

DETAILED DESCRIPTION OF A PREFERRED EMBODIMENT

Referring to the drawings, wherein like reference characters designate corresponding parts, there is illustrated in FIG. 1, in somewhat diagrammatic form, a seismic detection streamer or cable 10 secured to a drum 10a and towed through fresh water or sea water by a towing vessel, such as the vessel 11, at various preselected depths. The seismic detection streamer 10 includes a lead in cable 12 which may have fairings and contain signal wires, strain cables, and other connection elements required for operation, followed by, for example, an elastic section 13, and active sections 14, one or more of which may contain an associated spacer, as later described. Inactive sections may be interspersed in the streamer system as desired, and a conventional trailing device may be employed at the trailing end of the streamer. The system of the preferred embodiment herein described also includes depth indicator apparatus, indicated diagrammatically at 16, on board the towing vessel, to which electrical signals are transmitted through conductor wires extending through the streamer sections from the depth sensor means incorporated therein and through the lead in cable 12 to the depth indicator apparatus on the towing vessel. The general method of operation of such seismic streamer systems in conducting seismic exploration is described, for example, in the prior Paslay U.S. Pat. No. 2,465,696, and a typical construction of the streamer sections may be similar to that illustrated in prior Pearson U.S. Pat. No. 3,371,739. A number of pressure sensitive hydrophones, arranged in a desired array or group along the axis of the streamer, are provided in each of the active streamer sections. Examples of suitable pressure sensitive hydrophones for detecting seismic signals and transmitting electrical indications thereof to the signal processing equipment on the towing vessel are disclosed in earlier Pearson U.S. Pat. No. 3,660,809 or Pavey U.S. Pat. No. 3,930,254.

The streamer sections 14, many of which are arranged in serial relation along the streamer cable or streamer system and are coupled together by various types of coupling devices, typically may form a streamer of about one mile or more in length, with the arrays or groups of hydrophones in the respective active sections spaced in a desired arrangement along the associated streamer section. The outputs of the hydrophones in each section may be connected in parallel in the usual manner and connected to an impedance-matching transformer to couple the electrical voltage signals from the hydrophones produced responsive to the accoustic pressure variations sensed by the hydrophones to signal processing equipment on the towing vessel, or the hydrophones may be connected to the signal processing equipment in other ways, as by long twisted conductor pairs extending through the lead-in cable to the signal processing equipment connected at their ends remote from the hydrophones to amplifying equipment suitable for such an application. The signal wires from the hydrophones, the hydrophone arrays, and the transformers for each section, and from the depth sensor devices for those streamer sections having such depth sensor devices, as well as signal wires which lead through the particular streamer section for connection to signal wires in associated downstream active streamer sections leading to their particular hydrophone units, are connected in some manner at coupling devices provided between adjoining streamer sections, usually be means of multiterminal male and female plugs.

Each streamer section 14 is typically formed of an outer tubular jacket or hose 18 which is flexibly expandable to some degree, formed for example of polyvinyl material, surrounding and enclosing the internal components of the active streamer section, such as the strain cables, the signal cables, the hydrophone units 17, and the like. The jacket or jacket segments for each active streamer section are preferably sealed at each end to the end coupling members through which the signal conductors and strain cables pass, so that each streamer section forms one or more sealed chambers which are filled with oil or other liquid fluid to render the streamer substantially neutrally buoyant when filled with the liquid fluid and submerged within the water at the desired depth. The pressure of the buoyancy regulating fill liquid within the streamer section is preferably sufficient to dilate or expand the streamer section jacket slightly from its initial assembled condition.

Referring to FIG. 2, there is shown a fragmentary longitudinal section of a portion of an active streamer section wherein the outer tubular jacket 18 is interrupted by a special spacer 20, specially constructed to facilitate quick and accurate calibration of the sensor-indicator system. The special spacer 20 is of generally similar form to the end coupling members, and in the preferred embodiment, is illustrated as a generally cylindrical body formed, for example, of plastic suitable for the purpose which has bores extending axially therethrough for the strain cables, one of which is indicated at 21 and for the signal conductor bundles, indicated at 22, in accordance with usual practice. The opposite end portions of the cylindrical spacer body 20 are of slightly reduced diameter relative to the mid-portion, and correspond substantially to the inner diameter of the jacket sections 18a, 18b to be connected thereto. The end portions of the adjacent jacket sections 18a, 18b are tightly fitted over the reduced diameter end of the special spacer 20 and clamped thereon, for example, by clamping straps or bands 23.

As shown in FIG. 2, a depth sensor pressure transducer of conventional construction, for example, as indicated at 24, is mounted in a rigid housing 25 and is provided with terminals extending through sealed openings therefor in the rigid housing 25 which are electrically connected externally of the housing by conductor wires 26 incorporated into the signal conductor bundle 22 for electrical connection of the signals from the depth sensor pressure transducer 24 to the read-out indicator apparatus 16 on the towing vessel. The rigid housing 25 has a port 25a forming the only opening to the interior of the rigid housing 25, and which is connected by a tube 27 to a coupling fitting 28 fitted in the exit end or orifice of passage 29 in the spacer 20. Passage 29 extends to an internal calibration chamber 31 in the spacer 20 which contains a spring biased ball 32, and which includes a passage and exit orifice 33, shown extending inwardly from the bottom of the chamber or cavity 31, communicating with the buoyancy regulating liquid in the jacket, for example, through the bore 34 of the spacer. The spring biased ball 32, forming a valve member in the chamber 31, is movable between a first valve seat formed by, for example, O-ring 35 and a second valve seat formed by the O-ring 36. In the illustrated embodiment shown in FIGS. 3–5, the O-ring valve seats 35 and 36 are formed by an inner annular insert 37 having a hollow bore 37a extending therethrough and a radial passage 37b extending through the outer wall therefrom and having the inner end portion of the bore 37a shaped to receive the O-ring 36 and press it against the lower wall of the cavity or chamber 31 formed in the spacer, together with an outer annular insert 38 having a collar portion 38a shaped to support the O-ring 35 and having the bore thereof in the outer zone thereof threaded to receive a threaded plug member 39. The outer end portion of the annular insert 38 is provided with an outwardly flaring lip to press a sealing ring 40 against a shoulder at the entrance portion of the cavity or chamber 31 in the spacer, and the plug 39 is provided with an enlarged head 39a providing an annular surface adjacent the periphery thereof to press a sealing ring 41 against the top of the outer annular insert member 38. The exterior of the outer annular insert member 38 is also threaded, in the illustrated embodiment, to facilitate positioning of the same into proper position in the cavity 31, which is threaded along the appropriate region to receive the insert 38.

The ball valve member 32 is spring biased to a normal operation position seated against the O-ring valve seat 35, thereby placing the depth sensor pressure transducer 24 within the rigid housing 25 in hydraulically coupled or communicating relation through the tube 27, orifice and passage 29, chamber 31, and orifice and passage 33 with the buoyant oil or fill liquid in the streamer jacket 18. Thus the pressure exerted inside the rigid housing 25 to which the depth sensor 24 responds is the pressure of the oil or fill liquid in the jacket under this condition. Under normal operation of the streamer, the pressure exerted by the surrounding sea water through the jacket 18 on the fill liquid in the jacket is thus transmitted by the fill liquid to the depth sensor 24 since the fill liquid fills the passage and orifice 33, ball valve member 32, passage and orifice 29, and tube 27 and rigid housing 25. To facilitate quick and accurate calibration of the depth sensor-indicator system, a calibration fitting, indicated generally by the reference character 43, coupled by a tube with a pressure pump and gauge assembly, is provided having a probe or depresser to be inserted in the threaded bore portion of the outer insert 38 and into the chamber 31 when the plug member 39 is removed. The calibration fitting 43, in the illustrated embodiment, comprises an axially elongated tubular body 44 having a central bore 45 extending therethrough, with a nipple 46 at its upper or supply end on which a hose or tube 47 is coupled. In the specific form illustrated, the central bore 45 has a threaded, portion 45a at its discharge or probe end, a smooth-bored cylindrical mid-portion 45b, and a smaller diameter smooth-bored cylindrical portion 45c near the upper or supply end terminating in an outlet passage section 45d. An elongated, axially movable probe or depresser member 48 extends through the major portion of the bore 45 and projects from the probe end 44a of the body, and is of cylindrical configuration of the same diameter throughout its length as the diameter of the bore portion 45c, but includes a collar or shoulder formations 48a near its mid-region. An externally threaded guide insert 49 is threaded into the portion 45a of the bore 45, the external threads of which are of appropriate size and pitch to be threadedly mated with the threads of the threaded portion 38b of the outer annular insert 38 in which the threaded portion of the plug 39 is normally received. The guide insert 49 has a central bore of the same cylindrical configuration and diameter as the cylindrical portion of the depresser 48 to slidably guide the latter for axial movement in cooperation with the outer end portion of the depresser 48 which slides in the bore portion 45c of the calibration fitting body 44. A coil spring 50 surrounding the cylindrical portion of the depresser extending outwardly from the shoulder formations 48a is located in the larger diameter bore portion 45b and bears against the shoulder formations 48a to resiliently bias the depresser to its extended position. The tube or hose 47 coupled to the nipple formation 46 is connected at its opposite end to a pump 51, for example a hand operated pump having a gauge 52 associated therewith for indicating the pressure in the tube 47, which operates as a pressure supply tube for the calibration fitting 43.

By reason of this construction, one can readily remove the plug 39 by threading it out of the threaded portion 38b of the outer annular insert 38 in the special spacer 20, and thread the calibration fitting 43 therein by mating the threads on the guide insert portion 39 thereof with the threads in the threaded portion 38b of the outer annular insert 38. As the calibration fitting is threaded down into the outer annular insert 38 to the full extent permitted, the inner end of the depresser 48 which is of smaller diameter than the inner diameter of the first valve seat forming O-ring 35 projects into contact with the valve member ball 32 and forces it against the action of its biasing spring 42a to a position tightly sealing against the valve seat forming O-ring 36, assuming what we call the calibration position of the valve member ball 32. This seals the chamber 31 from the orifice and passage 33 and connects the pressure pump 51, pressure supply tube 47 and the bore portions 45c and 45b of the bore in the calibration fitting housing 43 through the kerf or relieved portion 48b of the depresser, which spans the axial length thereof, to thus place the chamber 31 in communication with the pump. Since the chamber 31 is also in communication with the interior of the depth sensor housing 25 through the tube 27 and orifice and passage 29, the pump is now in condition to apply pressure to the interior of the rigid depth sensor housing 25 and thereby apply controlled pressures to the depth sensor 24. The pump 51 is then operated to apply various desired pressures, as indicated in p.s.i. (or depth) on the gauge 52, to the interior of the rigid depth sensor housing 25 and these pressures or depths shown on the gauge 52 are then used to calibrate the pressure sensor read-out system of the streamer or array. When the calibration fitting 43 is backed out of the threaded portion of the outer annular insert 38 in the calibration chamber 31, the valve member ball 32 returns to its normal sealing condition against the first valve seat formed by the O-ring 35, thereby placing the interior of the depth sensor housing 25 again in communication with the fill fluid in the jacket through the calibration chamber 31 and orifice and passage 33, and the plug member 39 is replaced in the threaded portion of the annular insert 38 to return the streamer or array to operational condition.

It will be appreciated that an additional relief passage and sealing screw, indicated at 53, may also be provided in the calibration spacer 20 communicating through suitable interior passages in the spacer to the interior of the jacket sections 18a, 18b for bleed-off of air from the interior of the streamer jacket during filling of the same with buoyancy regulating fluid or for during servicing.

What is claimed is:

1. A marine seismic streamer section for a towed underwater seismic streamer of plural serially connected sections containing a hydrophone array and each filled with a buoyancy regulating fill liquid, the streamer section comprising an elongated streamer jacket of generally cylindrical tubular configuration housing the hydrophones and strain cables and signal wires extending therethrough and having end coupling members sealing the ends of the section against loss of fill liquid, a depth sensor located within said jacket for producing electrical signals indicative of the depth of the streamer, a rigid housing within said jacket surrounding said depth sensor, a valve housing body in said section forming a calibrating chamber therein provided with an externally accessible access port and having first and second fluid conduits extending from said chamber, means connecting the first fluid conduit to the interior of said rigid housing and connecting the second fluid conduit to the interior of the jacket to communicate with the fill liquid therein, a removable closure plug for said access port, valve means in said chamber including a movable valve member biased for movement along a valve movement axis to a first normal position placing said first and second fluid conduits in communication with each other for subjecting the interior of said rigid housing and the depth sensor therein to the depth signifying fill liquid pressure conditions in the jacket and having a second calibrating position sealing the second fluid conduit from said chamber and communicating the first fluid conduit and rigid housing interior with said access port, and said valve member in said first position being positioned relative to the access port to be engaged and moved to said second position by a probe introduced through the access port when the plug is removed for subjecting the interior of the rigid housing and depth sensor to gauged calibrating pressures from a source of gauged pressure.

2. A marine seismic streamer section as defined in claim 1, wherein said valve housing body is a generally cylindrical spacer interposed in the section having a diameter corresponding to the jacket diameter and sealed to the jacket.

3. A marine seismic streamer section as defined in claim 1, wherein said valve member is movable rectilinearly between said first and second positions along a valve movement axis substantially paralleling a diametric axis of the jacket and extending through said access port.

4. A marine seismic streamer section as defined in claim 2, wherein said valve member is movable rectilinearly between said first and second positions along a valve movement axis substantially paralleling a diametric axis of the jacket and extending through said access port.

5. A marine seismic streamer section as defined in claim 1, wherein said valve member is movable rectilinearly between said first and second positions along a valve movement axis substantially paralleling a diametric axis of the jacket and extending through said access port, and said second calibrating position of said valve member being located radially inwardly along said valve movement axis from said first normal position of the valve member.

6. A marine seismic streamer section as defined in claim 2, wherein said valve member is movable rectilinearly between said first and second positions along a valve movement axis substantially paralleling a diametric axis of the jacket and extending through said access port, and said second calibrating position of said valve member being located radially inwardly along said valve movement axis from said first normal position of the valve member.

7. A marine seismic streamer section as defined in claim 1, wherein said first fluid conduit joins said calibrating chamber at an intermediate region between the first and second positions of the valve member and extends laterally of the valve movement axis to communicate to the rigid housing and depth sensor the fill liquid pressure and selected gauged calibrating pressure from a probe in the access port for the first and second positions of the valve members respectively.

8. A marine seismic streamer section as defined in claim 3, wherein said first fluid conduit joins said calibrating chamber at an intermediate region between the first and second positions of the valve member and extends laterally of the valve movement axis to communicate to the rigid housing and depth sensor the fill liquid pressure and selected gauged calibrating pressure from a probe in the access port for the first and second positions of the valve members respectively.

9. A marine seismic streamer section as defined in claim 5, wherein said first fluid conduit joins said calibrating chamber at an intermediate region between the first and second positions of the valve member and extends laterally of the valve movement axis to communicate to the rigid housing and depth sensor the fill liquid pressure and selected gauged calibrating pressure from a probe in the access port for the first and second positions of the valve members respectively.

10. A marine seismic streamer section as defined in claim 1, wherein said valve means includes means defining first and second circular valve seats arranged in planes lying perpendicular to said valve movement axis and spaced from each other radially of the jacket with the first seat located further from the center of the jacket than the second seat for movement of the valve member therebetween, the valve seats being located at junctures of said first and second fluid conduits with said chamber, said valve member being a ball valve movable rectilinearly between said seats and being resiliently urged to said first position against said first valve seat and being displacable inwardly against the second seat by said probe.

11. A marine seismic streamer section as defined in claim 3, wherein said valve means includes means defining first and second circular valve seats arranged in planes lying perpendicular to said valve movement axis and spaced from each other radially of the jacket with the first seat located further from the center of the jacket than the second seat for movement of the valve member therebetween, the valve seats being located at junctures of said first and second fluid conduits with said chamber, said valve member being a ball valve movable rectilinearly between said seats and being resiliently urged to said first position against said first valve seat and being displacable inwardly against the second seat by said probe.

12. A marine seismic streamer section for an elongated seismic streamer made up of a plural sections to be serially connected together and towed underwater by a towing vessel and containing a plurality of hydrophones therein and each filled with a buoyancy regulating fill liquid, the streamer section comprising an elongated streamer jacket of generally cylindrical tubular configuration housing the hydrophones and strain cables and signal wires extending through the interior thereof, end coupling members sealing the ends of the section against loss of fill liquid, a depth sensor located within said jacket for producing electrical signals indicative of the depth of the streamer to be transmitted to depth indicating readout means on the towing vessel, a rigid housing within said jacket surrounding said depth sensor, a generally cylindrical spacer in said section sealed to said jacket providing an exposed peripheral access portion, said spacer including means defining an interior calibrating chamber therein provided with an access port opening through said access portion and having first and second branch passages from said chamber, conduit means connecting the first branch passage to the interior of said rigid housing and the second branch passage communicating with the interior of the jacket to communicate with the fill liquid therein, a removable closure plug for said access port, valve means in said chamber including a movable valve member biased for movement along a valve movement axis to occupy a first normal position placing said first and second branch passages in communication with each other for subjecting the interior of said rigid housing and the depth sensor therein to the fill liquid pressure conditions in the jacket and having a second calibrating position sealing the second branch passage from said chamber and communicating the first branch passage and rigid housing interior with said access port, and said valve member in said first position being positioned relative to the access port to be engaged and moved to said second position by a probe introduced through the access port when the plug is removed for subjecting the interior of the rigid housing and depth sensor to gauged calibrating pressures from a source of gauged pressure.

13. A marine seismic streamer section as defined in claim 12, wherein said valve member is movable rectilinearly between said first and second positions along a valve movement axis substantially paralleling a diametric axis of the jacket and extending through said access port.

14. A marine seismic streamer section as defined in claim 12, wherein said valve member is movable rectilinearly between said first and second positions along a valve movement axis substantially paralleling a diametric axis of the jacket and extending through said access port, and said second calibrating position of said valve member being located radially inwardly along said valve movement axis from said first normal position of the valve member.

15. A marine seismic streamer section as defined in claim 12, wherein said first branch passage joins said calibrating chamber at an intermediate region between the first and second positions of the valve member and extends laterally of the valve movement axis to communicate to the rigid housing and depth sensor the fill liquid pressure and selected gauged calibrating pressure from a probe in the access port for the first and second positions of the valve members respectively.

16. A marine seismic streamer section as defined in claim 14, wherein said first branch passage joins said calibrating chamber at an intermediate region between the first and second positions of the valve member and extends laterally of the valve movement axis to communicate to the rigid housing and depth sensor the fill liquid pressure and selected gauged calibrating pressure from a probe in the access port for the first and second positions of the valve members respectively.

17. A marine seismic streamer section as defined in claim 12, wherein said valve means includes means defining first and second circular valve seats arranged in planes lying perpendicular to said valve movement axis and spaced from each other radially of the jacket with the first seat located further from the center of the jacket than the second seat for movement of the valve member therebetween, the valve seats being located at junctures of said first and second branch passages with said chamber, said valve member being a ball valve movable rectilinearly between said seats and being resiliently urged to said first position against said first valve seat and being displacable inwardly against the second seat by said probe.

18. A marine seismic streamer section as defined in claim 14, wherein said valve means includes means defining first and second circular valve seats arranged in planes lying perpendicular to said valve movement axis and spaced from each other radially of the jacket with the first seat located further from the center of the jacket than the second seat for movement of the valve member therebetween, the valve seats being located at junctures of said first and second branch passages with said chamber, said valve member being a ball valve movable rectilinearly between said seats and being resiliently urged to said first position against said first valve seat and being displacable inwardly against the second seat by said probe.

19. A marine seismic streamer section for a towed underwater seismic streamer of plural serially connected sections containing a hydrophone array and each filled with a buoyancy regulating fill liquid, the streamer section comprisng an elongated streamer jacket of generally cylindrical configuration housing hydrophones and sealed at its ends against loss of fill liquid, a depth sensor located within said jacket for producing electrical signals indicative of the depth of the streamer responsive to pressure on the fill liquid within the jacket, a rigid housing within the jacket surrounding the depth sensor, valve means in said section having means defining a calibrating chamber provided with an externally accessible access port and having a valve member movable therein between first and second valve positions located along an access path from said access port, a removable closure plug for said access port, conduit means for placing said rigid housing in communication with the fill liquid in the jacket through said valve means at the first valve position for subjecting the depth sensor to the fill liquid pressure conditions in the jacket, and the valve means including means for sealing the conduit means communicating with the fill liquid in the jacket at said second valve position and communicating the interior of said rigid housing and depth sensor with said access port for subjecting the depth sensor to gauged calibrated pressures from a source of gauged pressure through a probe inserted into said access port along said access path when the removable closure plug is removed for calibration of the depth sensor signals relative to fill liquid pressures.

20. A marine seismic streamer section as defined in claim 19, wherein said valve member is located inwardly adjacent said access port when occupying said first valve position to be engaged by the probe introduced through the access port and displaced thereby to said second valve position for communicating through the calibrating chamber to the depth sensor in the rigid housing calibrating pressures from an external source of gauged pressure.

* * * * *